(12) United States Patent
Komatsu et al.

(10) Patent No.: US 10,621,421 B2
(45) Date of Patent: Apr. 14, 2020

(54) COMPUTER SYSTEM, DIALOGUE CONTROL METHOD, AND COMPUTER

(71) Applicant: Hitachi, Ltd., Tokyo (JP)

(72) Inventors: Yuto Komatsu, Tokyo (JP); Yoshitaka Hiramatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 16/002,039

(22) Filed: Jun. 7, 2018

(65) Prior Publication Data

US 2019/0005311 A1  Jan. 3, 2019

(30) Foreign Application Priority Data

Jun. 8, 2017 (JP) .................................. 2017-113189

(51) Int. Cl.
| | |
|---|---|
| *G06F 16/583* | (2019.01) |
| *G06K 9/00* | (2006.01) |
| *G10L 15/06* | (2013.01) |
| *G10L 15/22* | (2006.01) |
| *G06F 21/32* | (2013.01) |

(52) U.S. Cl.
CPC ....... *G06K 9/00288* (2013.01); *G06F 16/583* (2019.01); *G06F 21/32* (2013.01); *G10L 15/06* (2013.01); *G10L 15/22* (2013.01); *G06K 2009/00322* (2013.01); *G06K 2009/00932* (2013.01)

(58) Field of Classification Search
CPC combination set(s) only.
See application file for complete search history.

(56) References Cited

U.S. PATENT DOCUMENTS

| | | | |
|---|---|---|---|
| 6,173,266 B1 * | 1/2001 | Marx | G10L 15/22 704/270 |
| 6,765,997 B1 * | 7/2004 | Zirngibl | G06Q 10/10 379/88.16 |
| 7,505,921 B1 * | 3/2009 | Lukas | G06Q 30/0603 705/26.5 |
| 10,276,170 B2 * | 4/2019 | Gruber | G10L 17/22 |
| 2006/0274051 A1 * | 12/2006 | Longe | G06F 3/0237 345/173 |
| 2016/0197967 A1 * | 7/2016 | Kreifeldt | G06K 9/00255 |
| 2016/0371504 A1 * | 12/2016 | Huang | G06F 21/84 |
| 2017/0185825 A1 * | 6/2017 | Davis | G06F 21/316 |
| 2017/0250930 A1 * | 8/2017 | Ben-Itzhak | G06F 3/0488 |

FOREIGN PATENT DOCUMENTS

| | | |
|---|---|---|
| JP | 2010-108200 A | 5/2010 |
| JP | 2016-076117 A | 5/2016 |

\* cited by examiner

*Primary Examiner* — Tsung Yin Tsai
(74) *Attorney, Agent, or Firm* — Mattingly & Malur, PC

(57) ABSTRACT

A computer system that performs in dialogue with a user and provides a prescribed service, comprising: an imaging device; a computer; and a generation device generating dialogue content on a basis of an algorithm for generating dialogue content. The computer couples to a database that stores an authentication image used for an authentication process that uses an image. The computer calculates a distance between the user and the imaging device; executes an attribute estimation process in a case where the distance is larger than a threshold, selects the algorithm on the basis of results of the attribute estimation process, and issues a notification of the selected algorithm to the generation device.

12 Claims, 10 Drawing Sheets

LANGUAGE DICTIONARY 500

| LANGUAGE CLASS | LANGUAGE TYPE | LANGUAGE |
|---|---|---|
| PLACE NAME | JAPAN; PREFECTURES | HOKKAIDO, AOMORI, ... |
| PLACE NAME | JAPAN; MUNICIPALITIES | CITY OF AA, ... <br> TOWN OF AAA, ... |
| ⋮ | ⋮ | ⋮ |
| HOME APPLIANCES | REFRIGERATOR | [COMPANY A, A01-0001], ... |
| ⋮ | ⋮ | ⋮ |
| HOUSEHOLD GOODS | COOKING OIL | [COMPANY K, xxxxxx], ... |
| ⋮ | ⋮ | ⋮ |

*FIG. 5*

ESTIMATED USER TEMPLATE 600

| CLASS | TOPIC | DIALOGUE CONTENT |
|---|---|---|
| GREETING | - | HELLO, NICE TO MEET YOU. |
| GREETING | WEATHER | HELLO, TODAY'S WEATHER IS [WEATHER]. |
| ⋮ | ⋮ | ⋮ |
| REQUEST | RECOMMENDATIONS; PRODUCTS | I RECOMMEND [PRODUCT NAME]. |
| ⋮ | ⋮ | ⋮ |
| REQUEST | PLACE | [PLACE NAME] IS AT [POINT]. <br> PLEASE FOLLOW [ROUTE]. |
| REQUEST | PRICE | [PRODUCT NAME] COSTS [PRICE]. |

*FIG. 6A*

RECORDED USER TEMPLATE 610

| CLASS 611 | TOPIC 612 | DIALOGUE CONTENT 613 |
|---|---|---|
| GREETING | - | WELCOME, [NAME OF PERSON]. |
| GREETING | WEATHER | HELLO, [NAME OF PERSON]. TODAY'S WEATHER IS [WEATHER]. |
| ⋮ | ⋮ | ⋮ |
| SURVEY | PURCHASED ITEM | [NAME OF PERSON], HOW DO YOU LIKE YOUR [PRODUCT NAME]? |
| ⋮ | ⋮ | ⋮ |
| REQUEST | RECOMMENDATIONS | I RECOMMEND [PRODUCT NAME]. |
| REQUEST | PLACE | [PLACE NAME] IS AT [POINT]. PLEASE FOLLOW [ROUTE]. |
| REQUEST | PRICE | [PRODUCT NAME] COSTS [PRICE]. |
| ⋮ | ⋮ | ⋮ |

*FIG. 6B*

FACIAL IMAGE DATABASE 412

| ID 701 | FACIAL IMAGE 702 | FEATURE VALUE 703 | ATTRIBUTES 704 | | | |
|---|---|---|---|---|---|---|
| | | | No 711 | PERSONAL NAME 712 | GENDER 713 | AGE 714 |
| 1 | FACIAL IMAGE 1 | [10,12,3,...] | 00123 | aaaaa | FEMALE | 27 |
| 2 | FACIAL IMAGE 2 | [14,8,5,...] | 00020 | bbbbb | MALE | 36 |
| ⋮ | ⋮ | ⋮ | ⋮ | ⋮ | ⋮ | ⋮ |
| n | FACIAL IMAGE n | [9,11,2,...] | 11234 | nnnnn | FEMALE | 55 |
| ⋮ | ⋮ | ⋮ | ⋮ | ⋮ | ⋮ | ⋮ |

*FIG. 7*

VEIN IMAGE DATABASE 413

| id | VEIN IMAGE | FEATURE VALUE | ATTRIBUTES ||||
| | | | No 811 | PERSONAL NAME 812 | GENDER 813 | AGE 814 |
|---|---|---|---|---|---|---|
| 1 | VEIN IMAGE 1 | [3,6,7,...] | 00123 | aaaaa | FEMALE | 27 |
| 2 | VEIN IMAGE 2 | [4,11,9,...] | 00020 | bbbbb | MALE | 36 |
| : | : | : | : | : | : | : |
| n | VEIN IMAGE n | [9,15,11,...] | 11234 | nnnnn | FEMALE | 55 |
| : | : | : | : | : | : | : |

COMPUTER SYSTEM, DIALOGUE CONTROL METHOD, AND COMPUTER

CLAIM OF PRIORITY

The present application claims priority from Japanese patent application JP 2017-113189 filed on Jun. 8, 2017, the content of which is hereby incorporated by reference into this application.

BACKGROUND OF THE INVENTION

The present invention relates to a computer system that provides a service through dialogue with a user.

A technique in which a user is authenticated and a service is provided to the user on the basis of authentication results is well known. Services to be provided include services to facilitate the purchase of products, services to search for a destination, payment services, and the like.

One known user authentication method is the technique disclosed in Japanese Patent Application Laid-open Publication No. 2010-108200 A, for example. Japanese Patent Application Laid-open Publication No. 2010-108200 A indicates that "a recorded face database 150 records, for the same person, rough verification facial feature data and main verification facial feature data are recorded in association with each other. A detection unit 120 has inputted thereto in real time a far distance facial image from a far distance camera 11 and a near distance facial image from a near distance camera 21. An extraction unit 130 extracts the rough verification facial feature data from a far distance facial image and extracts the main verification facial feature data from the near distance facial image. A verification unit 140 searches a registered face database 150 for rough verification facial feature data matching the extracted rough verification facial feature data, and if there are one or more hits for the rough verification facial feature data, the verification unit identifies main verification facial feature data associated with the rough verification facial feature data, and determines if there is main verification facial feature data that matches the extracted main verification object data." The verification method disclosed in Japanese Patent Application Laid-open Publication No. 2010-108200 A can realize high speed and high accuracy authentication processing.

One known example of a system for performing in dialogue with a user is the technique disclosed in Japanese Patent Application Laid-open Publication No. 2016-76117 A, for example. Japanese Patent Application Laid-open Publication No. 2016-76117 A indicates that "a dialogue analysis unit 2 determines the emotional state of a user on the basis of dialogue content with the user, and a response type determination unit 4 determines a type of response to the dialogue content with the user on the basis of the emotional state. Also, a dialogue generation unit 7 acquires user preference information (topic information, entity information, for example) from a personal database 10, acquires a template based on the response type from a dialogue database 8, and outputs content merging the user preference information into the template as dialogue content."

SUMMARY OF THE INVENTION

In a computer system that performs in dialogue with a user and provides a service, accuracy in the dialogue content outputted to the user and higher response speeds are sought in order to realize natural and satisfactory dialogue that would encourage use of the service. By combining the techniques of Japanese Patent Application Laid-open Publication No. 2010-108200 A and Japanese Patent Application Laid-open Publication No. 2016-76117 A, it is possible to understand the dialogue content with the user and to quickly identify a user. As a result, the computer system can accurately and quickly understand the needs and characteristics of a user and output appropriate dialogue content.

However, with the technique of Japanese Patent Application Laid-open Publication No. 2010-108200 A, it is necessary to perform two different authentication processes with differing accuracies, and thus, dialogue with the user cannot be performed until the authentication processes are complete. Thus, the response speed cannot be sufficiently increased. Also, it is not possible to perform in dialogue with a user who is not recorded in the authentication database.

Thus, as a result of a loss of interest by the user, a reduction in satisfaction towards the service, or the like, there is a risk that an opportunity for the user to use the service would be lost and that normal service cannot be provided.

It is possible to increase the speed of the authentication processes by increasing the amount of resources in the computer, but that makes it difficult to miniaturize the device containing the system, and would increase the overall cost of the system.

The present invention provides a system, method, and computer for realizing natural and satisfactory dialogue that would encourage use of a service.

A representative example of the invention disclosed in the present application is as follows. A computer system that performs in dialogue with a user and provides a prescribed service, comprises an imaging device being configured to obtain an image, a computer being configured to select an algorithm for generating dialogue content to be outputted to the user, and a generation device being configured to generate dialogue content on the basis of the algorithm. The computer has an arithmetic device, a storage device coupled to the arithmetic device, and an interface coupled to the arithmetic device, and couples, through the interface, to a database that stores an authentication image used for an authentication process that uses an image obtained by the imaging device. The arithmetic device is configured to: calculate a distance between the user and the imaging device; execute an attribute estimation process that estimates an attribute that characterizes the user using the image obtained by the imaging device in a case where the distance is larger than a first threshold, and select the algorithm on the basis of results of the attribute estimation process; execute an authentication process that identifies the user on the basis of the image obtained by the imaging device and the database in a case where the distance is less than or equal to the first threshold, and select the algorithm on the basis of results of the authentication process; and issues a notification of the selected algorithm to the generation device.

According to the present invention, by selecting an algorithm based on the results of an attribute estimation process, it is possible to quickly and appropriately output dialogue content, thereby allowing for natural and satisfactory dialogue that would encourage use of a service. Other objects, configurations, and effects than the above become apparent from the following description of the embodiments.

BRIEF DESCRIPTION OF THE DRAWINGS

The present invention can be appreciated by the description which follows in conjunction with the following figures, wherein:

FIG. 5 is a table for showing an example of a data structure of a language dictionary included in a dialogue database of Embodiment 1;

FIG. 6A is a table for showing an example of a data structure of an estimated user template included in the dialogue database of Embodiment 1;

FIG. 6B is a table for showing an example of a data structure of a recorded user template included in the dialogue database of Embodiment 1;

FIG. 7 is a table for showing an example of a data structure of a facial image database of Embodiment 1;

DETAILED DESCRIPTION OF EMBODIMENTS

Figure 1:
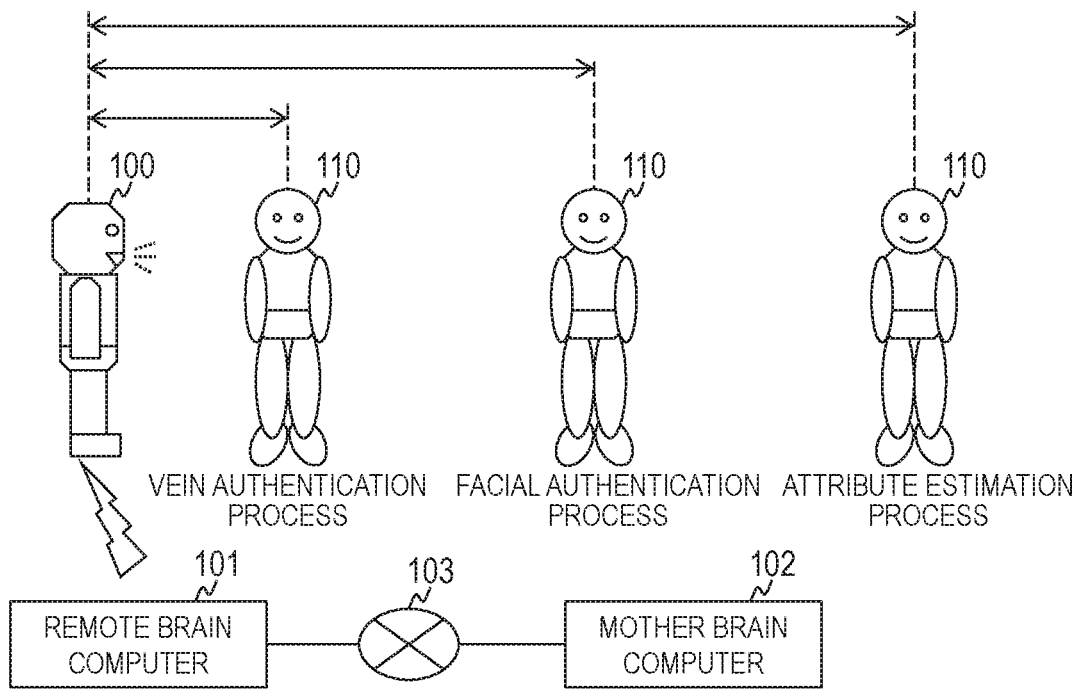
FIG. 1 is a diagram for illustrating one example of a configuration of a computer system of Embodiment 1.

Embodiments of the present invention will be described below with reference to drawings. However, the present invention should not be interpreted as being limited to the content of the embodiments described below. A person having ordinary skill in the art could easily understand that it is possible to modify specific configurations of the present invention without departing from the idea and spirit thereof.

In the configuration of the invention described below, same or similar configurations or functions are assigned the same reference characters, and redundant explanations thereof are omitted.

Indications such as "first", "second", "third", etc. in the present specification are for distinguishing components, and do not necessarily limit the number or order thereof.

The positions, sizes, shapes, ranges, and the like of the components as shown in the drawings and the like are indicated for ease of understanding of the invention, and in some cases do not represent the actual positions, sizes, shapes, ranges, and the like of those components. Thus, the present invention is not limited to the positions, sizes, shapes, ranges, and the like disclosed in the drawings and the like.

Embodiment 1

FIG. 1 is a diagram for illustrating one example of a configuration of a computer system of Embodiment 1.

The computer system is constituted of a dialogue device 100, a remote brain computer 101, and a mother brain computer 102. The remote brain computer 101 is connected to the dialogue device 100 through a network (not shown in the drawings) such as a wireless network. Also, the remote brain computer 101 is connected to the mother brain computer 102 through a network 103.

The dialogue device 100 is a device for performing in dialogue with a user 110. Examples of the dialogue device 100 include robots and the like, for example. The dialogue device 100 may be constituted of a display, a sound collection microphone, and a speaker.

The dialogue device 100 measures the distance between the dialogue device 100 and the user 110, and performs in dialogue with the user 110. In the computer system shown in FIG. 1, there is one dialogue device 100, but there may be a plurality thereof.

The remote brain computer 101 controls the dialogue device 100. More specifically, the remote brain computer 101 selects an algorithm for generating dialogue content to be outputted to the user on the basis of the distance measured by the dialogue device 100. In the computer system shown in FIG. 1, there is one remote brain computer 101, but there may be a plurality thereof.

The mother brain computer 102 manages information.

Figure 2:
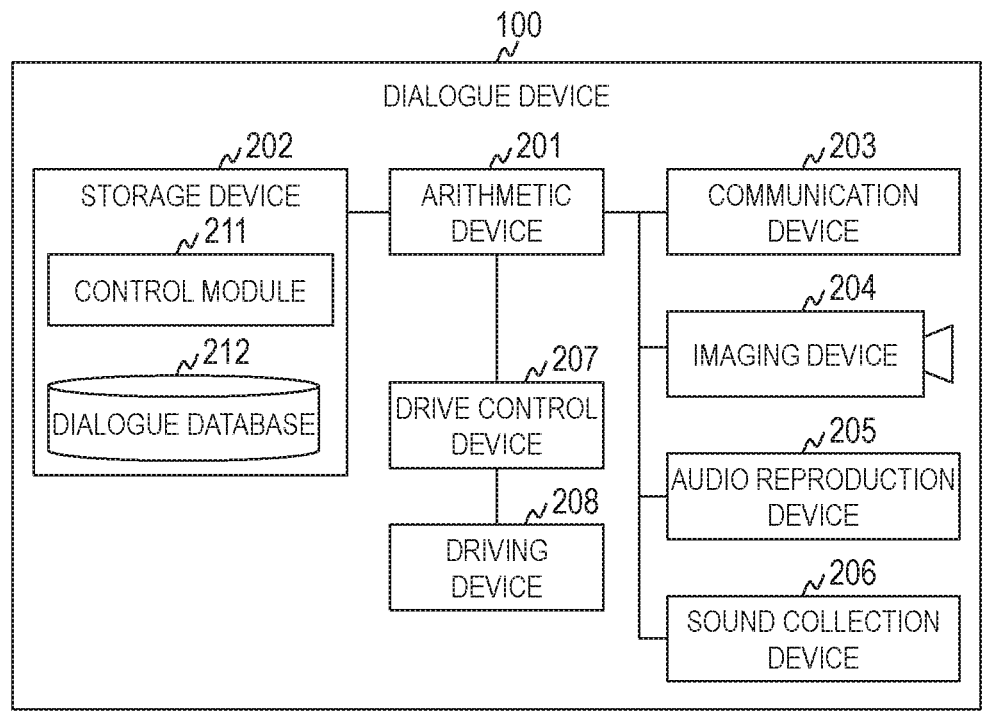
FIG. 2 is a diagram for illustrating a hardware configuration and a software configuration of a dialogue device of Embodiment 1.

FIG. 2 is a diagram for illustrating a hardware configuration and a software configuration of the dialogue device 100 of Embodiment 1.

The dialogue device 100 has an arithmetic device 201, a storage device 202, a communication device 203, an imaging device 204, an audio reproduction device 205, a sound collection device 206, a drive control device 207, and a driving device 208. The respective pieces of hardware are connected to each other through an internal bus or the like.

The arithmetic device 201 is a device such as a CPU (central processing unit). The arithmetic device 201 executes programs stored in the storage device 202. The arithmetic device 201 executes processes according to programs, thereby operating as modules to realize specific functions. In the description below, when a module is indicated as executing a process, it in fact signifies that the arithmetic device 201 is executing a program to realize the module.

The storage device 202 is a device such as memory, and stores programs to be executed by the arithmetic device 201 and information necessary for executing the programs. Also, the storage device 202 includes a work area to be used by programs. The dialogue device 100 may have a storage device such as an HDD (hard disk drive) or an SSD (solid state drive).

In the present embodiment, the storage device 202 stores a program for realizing a control module 211, and also stores a dialogue database 212.

The control module 211 controls the dialogue device 100 and executes a dialogue process to generate dialogue content and output the dialogue content to the user 110.

In the dialogue process, the control module 211 analyzes the dialogue content of the user 110 using a language dictionary 500 to be described later in order to understand the meaning of the dialogue content of the user 110. Also, the control module 211 generates dialogue content to be outputted on the basis of analysis results of the dialogue content of the user 110 and an estimated user template 600 or a recorded user template 610, and outputs the dialogue content to the user 110.

The dialogue database 212 stores various information to be used for dialogue with the user 110. The dialogue database 212 may store the same data as a dialogue database 314 (see FIG. 3) stored in the remote brain computer 101, or may store only a portion of the data in the dialogue database 314.

The communication device 203 is a device such as a network interface that connects to other devices through a network. The imaging device 204 is a device such as a camera and obtains images in a prescribed range. The audio reproduction device 205 is a device such as a speaker and plays the dialogue content as speech. The sound collection device 206 is a device such as a sound collection microphone and obtains speech from the user 110.

The drive control device 207 is a device such as a microcomputer chip and controls the driving device 208. The driving device 208 is a device such as a motor and causes the dialogue device 100 to move.

In the present embodiment, an image obtained by the imaging device 204 is used to measure the distance between the dialogue device 100 and the user 110. The present invention is not limited to the aforementioned distance measurement method. A distance measurement method that employs a sound wave or a laser beam may be used, for example. If a distance measurement method that employs a sound wave or a laser beam is to be used, then the dialogue device 100 has a device for emitting a sound wave or a laser beam. Also, a distance measurement method that uses the loudness of the voice of the user 110 may be used.

Figure 3:
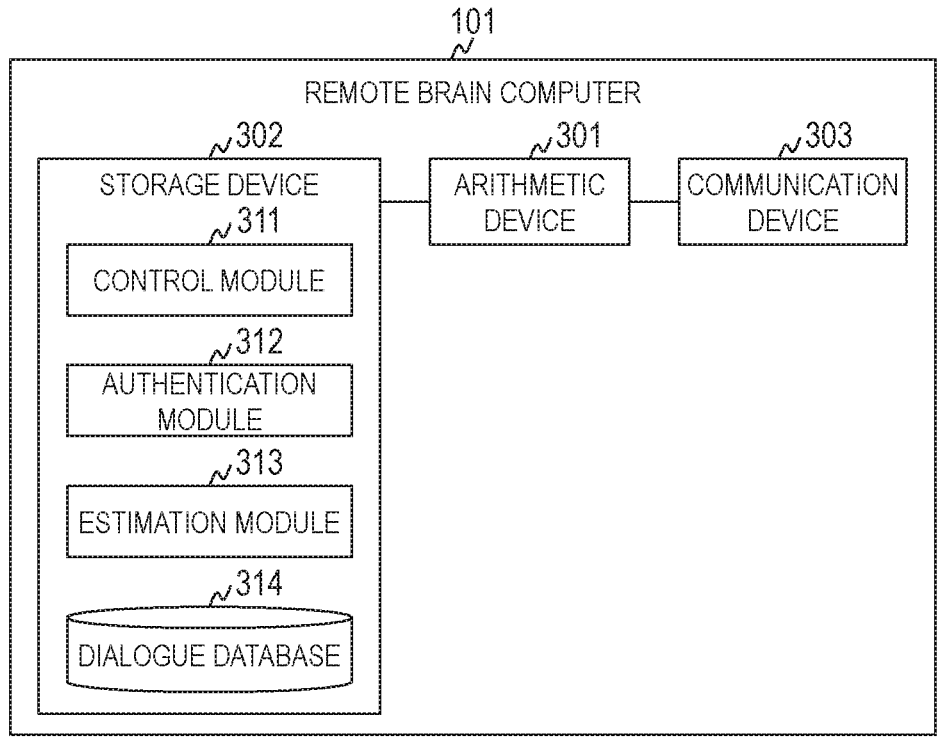
FIG. 3 is a diagram for illustrating a hardware configuration and a software configuration of a remote brain computer of Embodiment 1.

FIG. 3 is a diagram for illustrating a hardware configuration and a software configuration of the remote brain computer 101 of Embodiment 1.

The remote brain computer 101 has an arithmetic device 301, a storage device 302, and a communication device 303. The respective pieces of hardware are connected to each other through an internal bus or the like.

The arithmetic device 301, the storage device 302, and the communication device 303 are the same as the arithmetic device 201, the storage device 202, and the communication device 203.

The storage device 302 stores programs for realizing a control module 311, an authentication module 312, and an estimation module 313, and also stores the dialogue database 314.

The control module 311 controls the remote brain computer 101. The authentication module 312 executes an authentication process using an image. The estimation module 313 executes an estimation process using the image. Here, the estimation process is for estimating attributes indicating the characteristics of the user. Attributes include age, gender, and the like. The dialogue database 314 stores various information to be used for dialogue with the user 110. The dialogue database 314 is set in advance. Details of the dialogue database 314 will be described with reference to FIGS. 5, 6A, and 6B.

Figure 4:
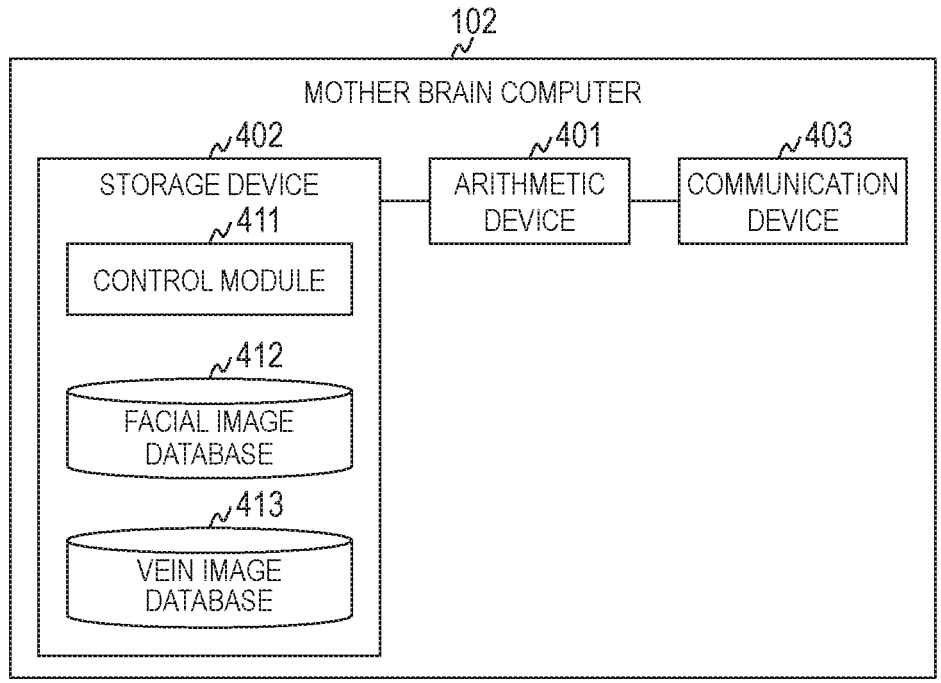
FIG. 4 is a diagram for illustrating a hardware configuration and a software configuration of a mother brain computer of Embodiment 1.

FIG. 4 is a diagram for illustrating a hardware configuration and a software configuration of the mother brain computer 102 of Embodiment 1.

The mother brain computer 102 has an arithmetic device 401, a storage device 402, and a communication device 403. The respective pieces of hardware are connected to each other through an internal bus or the like.

The arithmetic device 401, the storage device 402, and the communication device 403 are the same as the arithmetic device 201, the storage device 202, and the communication device 203.

The storage device 402 stores a program for realizing a control module 411, and also stores a facial image database 412 and a vein image database 413.

The control module 411 controls the mother brain computer 102. The facial image database 412 is a database for managing facial images of the users 110. The vein image database 413 is a database for managing vein images of the users 110.

Next, the information stored in the dialogue database 314 will be described with reference to FIGS. 5, 6A, and 6B. The dialogue database 314 includes the language dictionary 500, the estimated user template 600, and the recorded user template 610.

FIG. 5 is a table for showing an example of a data structure of the language dictionary 500 included in the dialogue database 314 of Embodiment 1.

The language dictionary 500 is information used for interpreting the dialogue content of the user 110. The language dictionary 500 includes entries constituted of a language class 501, a language type 502, and a language 503. Each entry corresponds to one language group (partial group).

The language class 501 is a field that stores identification information of a language group. The language type 502 is a field that stores identification information of a partial group that is a portion of the language group. The language 503 is a field that stores the language constituting the partial group.

In a language 503 of an entry whose the language class 501 is "home appliances" or "household goods", a group including the company name and product number is stored as one element constituting the partial group.

FIG. 6A is a table for showing an example of a data structure of the estimated user template 600 included in the dialogue database 314 of Embodiment 1.

The estimated user template 600 is a template that defines the dialogue content to be outputted to a user 110 who has not been authenticated or a user 110 who is not recorded in the database. There are a plurality of estimated user templates 600 for each combination of attributes. In the present embodiment, there is an estimated user template 600 for each combination of age and gender.

The estimated user template 600 includes entries constituted of a class 601, a topic 602, and dialogue content 603. Each entry corresponds to one piece of dialogue content.

The class 601 is a field that stores identification information of a group indicating the type of dialogue content to be outputted. The topic 602 is a field that stores the type of topic included in the dialogue content corresponding to the class 601. The topic 602 may be blank if the dialogue content does not require a topic to be included. The dialogue content 603 is a field for storing the dialogue content to be outputted to the user 110.

Words in brackets such as "weather", "product name", "place name", and "route" are words that are replaced on the basis of analysis results of the image, analysis results of the dialogue content of the user, and the history of the dialogue content. The second entry "weather" is replaced by the weather at the time of the dialogue content being outputted, for example.

FIG. 6B is a table for showing an example of a data structure of the recorded user template 610 included in the dialogue database 314 of Embodiment 1.

The recorded user template 610 is a template that defines the dialogue content to be outputted to a user 110 recorded in the database. The recorded user template 610 includes entries constituted of a class 611, a topic 612, and dialogue content 613. Each entry corresponds to one piece of dialogue content.

The class 611, the topic 612, and the dialogue content 613 are the same as the class 601, the topic 602, and the dialogue content 603.

The estimated user template 600 and the recorded user template 610 correspond to algorithms for generating the dialogue content to be outputted to the user 110. Thus, the selection of a template is equivalent to selecting an algorithm for generating dialogue content. The present invention is not limited to the use of an algorithm.

Next, the database managed by the mother brain computer 102 will be described with reference to FIGS. 7 and 8.

FIG. 7 is a table for showing an example of a data structure of the facial image database 412 of Embodiment 1.

The facial image database 412 includes entries constituted of an ID 701, a facial image 702, a feature value 703, and attributes 704. Each entry corresponds to one user 110.

The ID 701 is a field which stores identification information for identifying an entry stored in the facial image database 412. The facial image 702 is a field which stores a facial image used for authentication. If the facial image is stored in another storage region, then the facial image 702 field may store a pointer indicating the location of the storage region. The feature value 703 is a field which stores a feature value calculated from the facial image. The feature value 703 stores a feature vector, for example. The attributes 704 are fields for storing attributes of the user 110.

The attributes 704 of the present embodiment include a number 711, a personal name 712, a gender 713, and an age 714. The aforementioned attributes constitute just one example and are not limited thereto.

The number 711 is a field for storing identification information assigned to the user 110. The personal name 712 is a field for storing the personal name of the user 110. The gender 713 is a field for storing the gender of the user 110. The age 714 is a field for storing the age of the user 110.

The method for recording entries in the facial image database 412 may be a method in which the remote brain computer 101 automatically sets the entries on the basis of analysis results of the image, or a method in which the entries are manually set using a specialized UI. In the present embodiment, as will be described later, the facial image database 412 temporarily records entries for user who are not recorded.

Figures 8, 9:
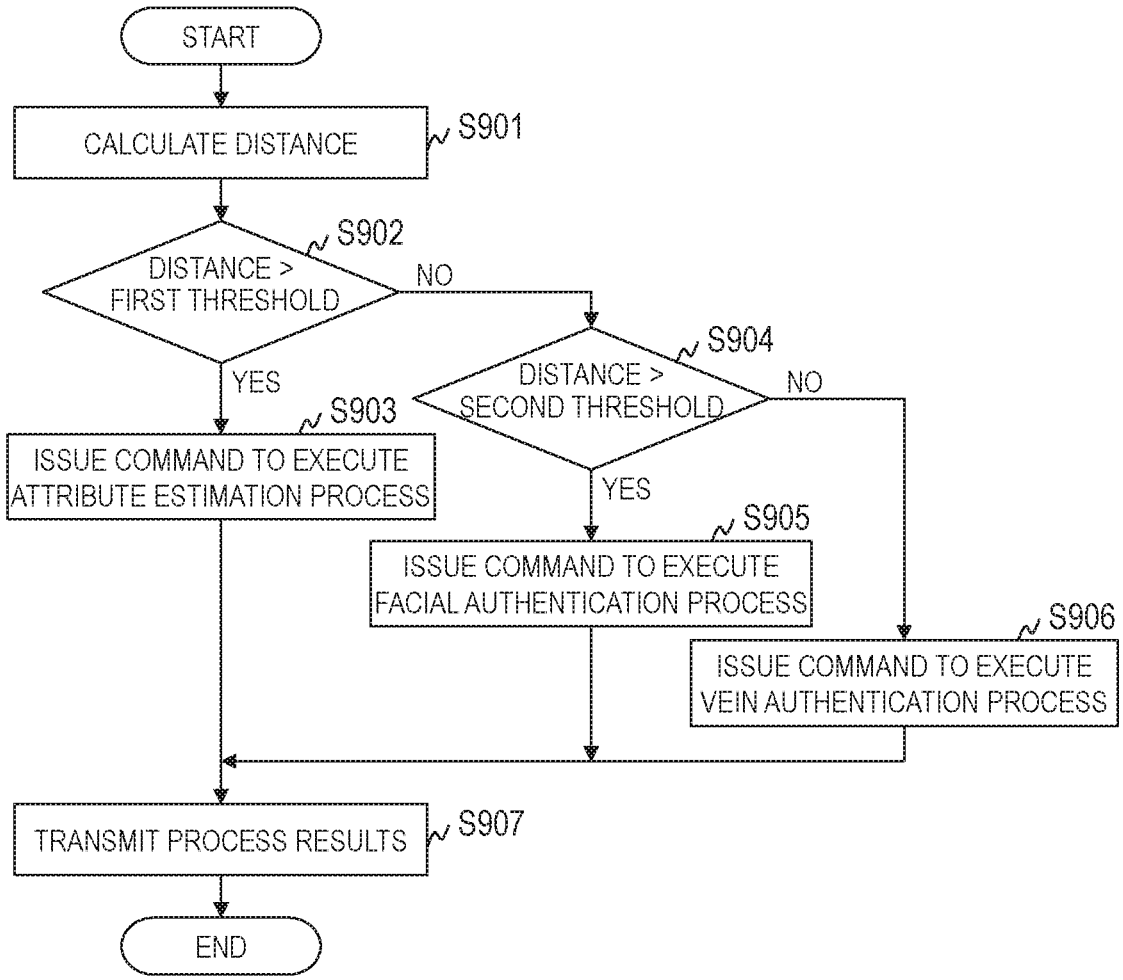
FIG. 8 is a table for showing an example of a data structure of a vein image database of Embodiment 1.
FIG. 9 is a flowchart for illustrating a summary of a process to be executed by the remote brain computer of Embodiment 1.

FIG. 8 is a table for showing an example of a data structure of the vein image database 413 of Embodiment 1.

The vein image database 413 includes entries constituted an ID 801, a vein image 802, a feature value 803, and attributes 804. Each entry corresponds to one user 110.

The ID 801 and the attributes 804 are the same as the ID 701 and the attributes 704. The attributes included in the attributes 804 need not be the same as the attributes included in the attributes 704.

The vein image 802 is a field which stores a vein image used for authentication. If the vein image is stored in another storage region, then the vein image 802 may store a pointer indicating the location of the storage region. The feature value 803 is a field that stores a feature value calculated from the vein image. The feature value 803 stores a feature vector, for example.

The method for recording entries in the vein image database 413 may be a method in which the remote brain computer 101 automatically sets the entries on the basis of analysis results of the image, or a method in which the entries are manually set using a specialized UI.

FIG. 9 is a flowchart for illustrating a summary of a process to be executed by the remote brain computer 101 of Embodiment 1.

In a case where the dialogue device 100 detects a periodic or singular event, it obtains an image using the imaging device 204 and transmits the image to the remote brain computer 101. The remote brain computer 101 determines whether or not a person is included in the obtained image. A publicly known technique may be used for the method for identifying whether there is a person in the image, and thus, detailed descriptions thereof are omitted.

The remote brain computer 101 starts the process described below in a case where a person is included in the obtained image.

First, the control module 311 of the remote brain computer 101 calculates the distance between the dialogue device 100 and the user 110 by using the received image (step S901). At this time, the control module 311 extracts a facial image from the received image. The dialogue device 100 may determine the presence or absence of a person in the image and extract a facial image.

The control module 311 determines whether the calculated distance is larger than a first threshold (step S902).

In a case where the distance is determined to be larger than the first threshold, then the control module 311 calls the estimation module 313 and issues an instruction to execute an attribute estimation process (step S903). The control module 311 transmits the results of the attribute estimation process to the dialogue device 100 (step S907).

In a case where the distance is determined to be less than or equal to the first threshold, the control module 311 determines whether the distance is larger than a second threshold (step S904).

In a case where the distance is determined to be larger than the second threshold, then the control module 311 calls the authentication module 312 and issues an instruction to execute a facial authentication process (step S905). The control module 311 transmits the results of the facial authentication process to the dialogue device 100 (step S907).

In a case where the distance is determined to be less than or equal to the second threshold, then the control module 311 calls the authentication module 312 and issues an instruction to execute a vein authentication process (step S906). The control module 311 transmits the results of the vein authentication process to the dialogue device 100 (step S907).

In a case where a vein image needs to be obtained separately from the facial image, then the control module 311 of the remote brain computer 101 issues an instruction to the dialogue device 100 to obtain the vein image. In this case, the control module 211 of the dialogue device 100 guides the user 110 to a prescribed position, obtains a vein image from the user 110 using the imaging device 204 and transmits the vein image to the remote brain computer 101.

The dialogue device 100 executes the dialogue process on the basis of the results of the attribute estimation process, the results of the facial authentication process, or the results of the vein authentication process received from the remote brain computer 101.

Even while executing the dialogue process, the process of steps S901 to S906 is executed. In this case, the dialogue device 100 modifies the dialogue process according to the process results. If a user 110 is already identified, then the process of steps S901 to S906 need not be executed. However, if the accuracy of the authentication process is low, then the remote brain computer 101 may execute the process of steps S901 to S906 regardless of the results of the authentication process.

In a case where a plurality of users 110 are included in the image, then one possible method is for the remote brain computer 101 to execute the process on the user 110 who is closest to the dialogue device 100.

Figure 10A:
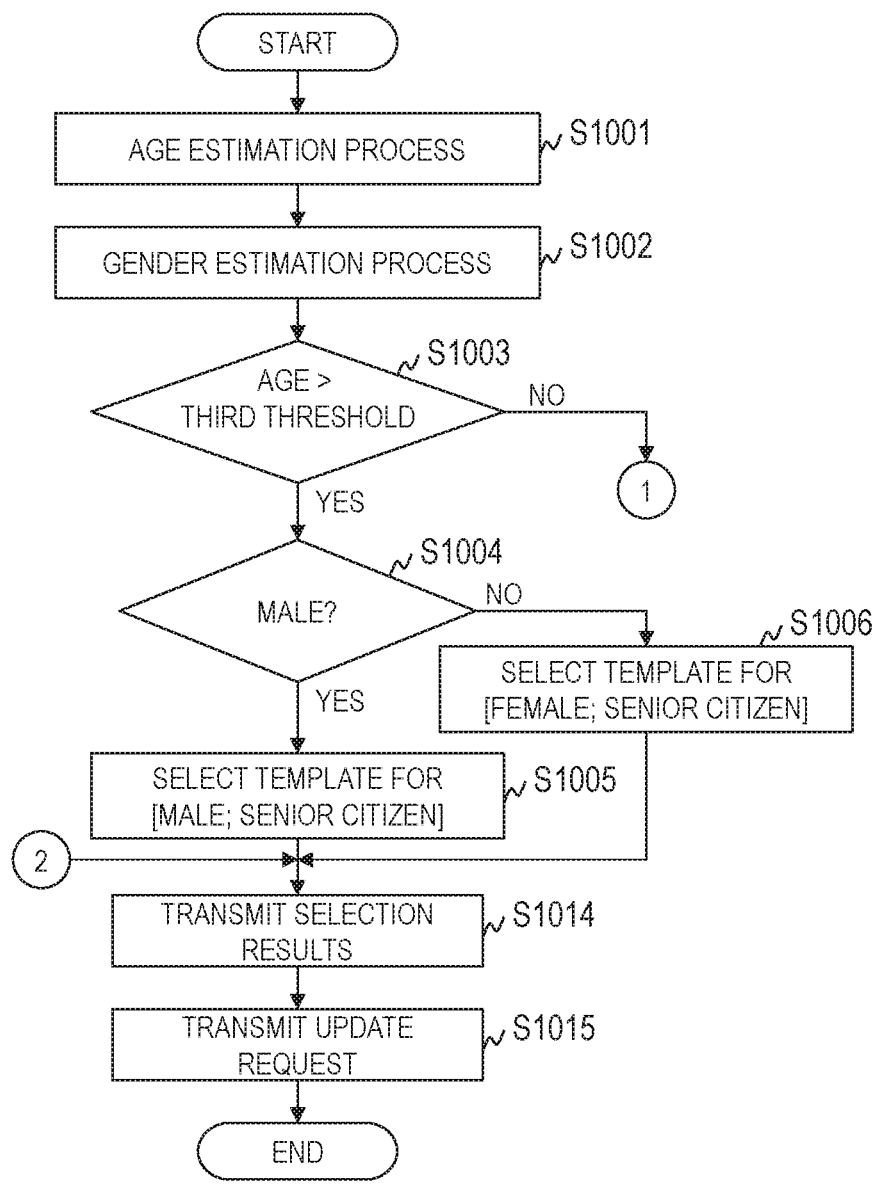
FIGS. 10A and 10B are flowcharts for illustrating one example of an attribute estimation process executed by an estimation module of Embodiment 1.
Figure 10B:
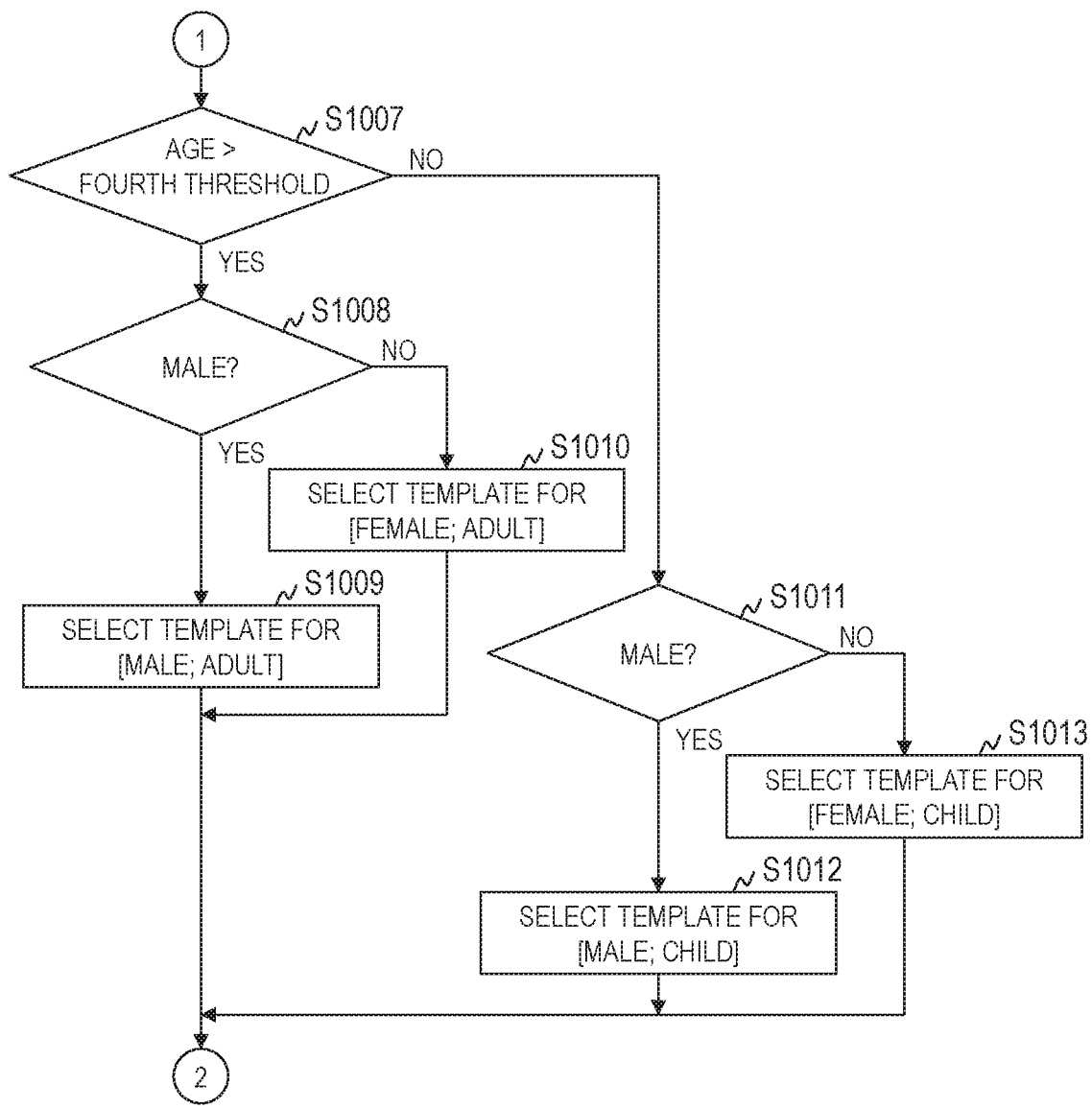

FIGS. 10A and 10B are flowcharts for illustrating one example of the attribute estimation process executed by the estimation module 313 of Embodiment 1.

The estimation module 313 executes an age estimation process and a gender estimation process using a facial image (step S1001, step S1002). A publicly known technique may be used for the age estimation process and the gender estimation process, and thus, detailed descriptions thereof are omitted.

Next, the estimation module 313 determines whether the age of the user 110 is larger than a third threshold (step S1003).

In a case where the age is determined to be larger than the third threshold, the estimation module 313 determines whether or not the gender of the user 110 is male (step S1004).

In a case where the gender of the user 110 is determined to be male, then the estimation module 313 selects an estimated user template 600 aimed at male senior citizens (step S1005). Then, the estimation module 313 proceeds to step S1014.

In a case where the gender of the user 110 is determined to be female, then the estimation module 313 selects an estimated user template 600 aimed at female senior citizens (step S1006). Then, the estimation module 313 proceeds to step S1014.

In step S1003, in a case where the age is determined to be less than or equal to the third threshold, the control module 313 determines whether the age of the user 110 is larger than a fourth threshold (step S1007).

In a case where the age of the user 110 is determined to be larger than the fourth threshold, the estimation module 313 determines whether or not the gender of the user 110 is male (step S1008).

In a case where the gender of the user 110 is determined to be male, then the estimation module 313 selects an estimated user template 600 aimed at male adults (step S1009). Then, the estimation module 313 proceeds to step S1014.

In a case where the gender of the user 110 is determined to be female, then the estimation module 313 selects an estimated user template 600 aimed at female adults (step S1010). Then, the estimation module 313 proceeds to step S1014.

In step S1007, in a case where the age of the user 110 is determined to be less than or equal to the fourth threshold, the estimation module 313 determines whether or not the gender of the user 110 is male (step S1011).

In a case where the gender of the user 110 is determined to be male, then the estimation module 313 selects an estimated user template 600 aimed at male children (step S1012). Then, the estimation module 313 proceeds to step S1014.

In a case where the gender of the user 110 is determined to be female, then the estimation module 313 selects an estimated user template 600 aimed at female children (step S1013). Then, the estimation module 313 proceeds to step S1014.

In step S1014, the estimation module 313 transmits the selection results for the estimated user template 600 to the dialogue device 100 (step S1014). At this time, the estimation module 313 may transmit the selected estimated user template 600 to the dialogue device 100.

Next, the estimation module 313 transmits an update request for the facial image database 412 to the mother brain computer 102 through the control module 311 (step S1015). Then, the estimation module 313 issues a notification to the control module 311 that the process is complete. The update request includes a facial image and a feature value, and the gender and age, which are estimation results.

In a case where the control module 411 of the mother brain computer 102 receives the update request, the control module 411 adds an entry to the facial image database 412, sets identification information in the ID 701 of the added entry. The control module 411 sets the facial image included in the update request in the facial image 702 of the added entry, and sets the feature value of the facial image in the feature value 703. Also, the control module 411 sets the estimation results in the gender 713 and the age 714 included in the attributes 704 of the added entry. At this point, the number 711 and the personal name 712 are blank.

In a case where a plurality of users 110 are included in the image, then the remote brain computer 101 executes the attribute estimation process on each user 110 and executes a statistical process using the processing results. Regarding age, for example, an average value is calculated. In the case of gender, the gender of the majority of people present is calculated as the gender used for the process. The remote brain computer 101 selects the estimated user template 600 shared among the plurality of users 110 on the basis of the calculated age and gender.

Figure 11:
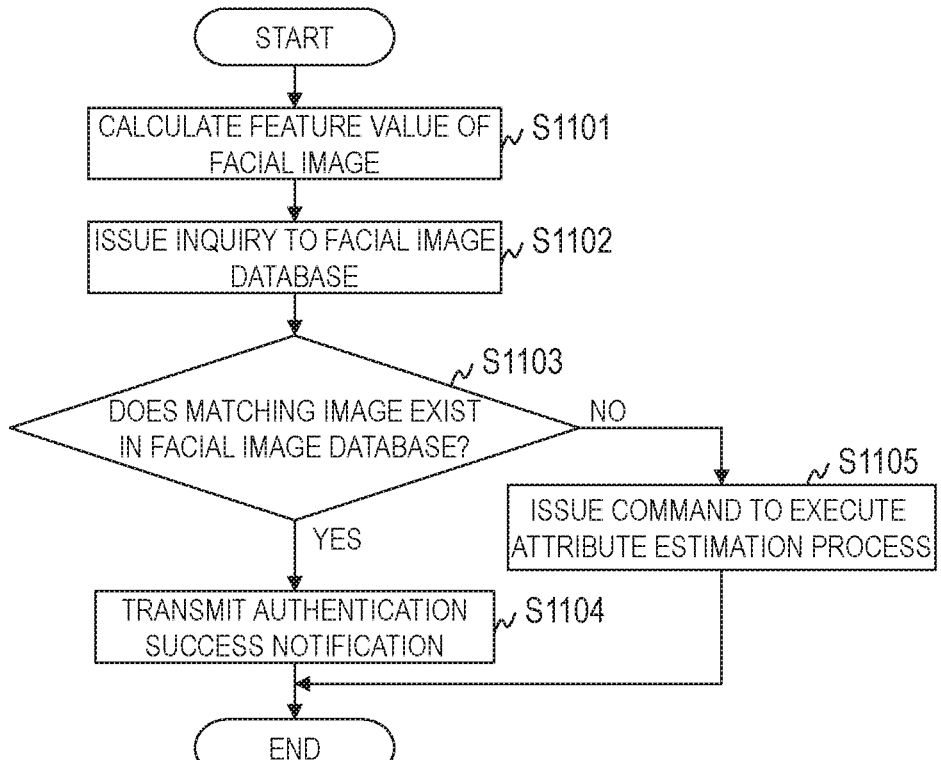
FIG. 11 is a flowchart for illustrating one example of a facial authentication process executed by an authentication module of Embodiment 1.

FIG. 11 is a flowchart for illustrating one example of a facial authentication process executed by the authentication module 312 of Embodiment 1.

The authentication module 312 calculates the feature value of the facial image (step S1101). If a feature value of the facial image has been received from the dialogue device 100, then step S1101 can be omitted.

The authentication module 312 issues, to the mother brain computer 102, an inquiry of the facial image database 412 including the feature value of the facial image (step S1102).

The authentication module 312 determines whether an image matching the facial image obtained by the dialogue device 100 exists in the facial image database 412 on the basis of the inquiry results (step S1103).

In a case where it is determined that an image matching the facial image obtained by the dialogue device 100 exists in the facial image database 412, the authentication module 312 transmits an authentication success notification including information of the identified entry, through the control module 311 (step S1104). Then, the authentication module 312 ends the facial authentication process. At this time, the authentication module 312 may transmit the recorded user template 610 to the dialogue device 100 through the control module 311.

In a case where it is determined that an image matching the facial image obtained by the dialogue device 100 does not exist in the facial image database 412, the authentication module 312 calls the estimation module 313 and issues an instruction to execute an attribute estimation process, through the control module 311 (step S1105). Then, the authentication module 312 ends the facial authentication process.

If the attribute estimation process has already been executed, the remote brain computer 101 need not repeat the attribute estimation process.

Figure 12:
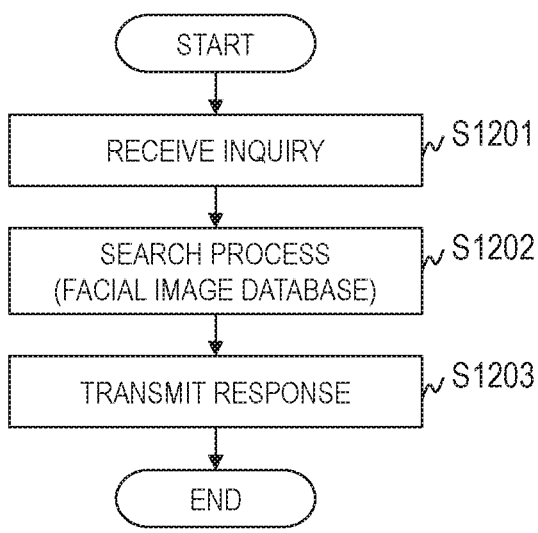
FIG. 12 is a flowchart for illustrating one example of a search process of the facial image database executed by a control module of Embodiment 1.

FIG. 12 is a flowchart for illustrating one example of a search process of the facial image database 412 executed by the control module 411 of Embodiment 1.

The control module 411 receives the inquiry of the facial image database 412 from the remote brain computer 101 (step S1201).

Next, the control module 411 executes a search process using the feature value of the facial image included in the inquiry (step S1202).

Specifically, the control module 411 calculates an image similarity by using the feature value of the facial image and the feature value 703 of each entry of the facial image database 412. The control module 411 identifies entries whose the image similarity is larger than a fifth threshold. In a case where there are a plurality of entries whose the image similarity is larger than the fifth threshold, then the control module 411 selects one entry with the highest image similarity.

Next, the control module 411 transmits a response including the search results to the remote brain computer 101 (step S1203).

In a case where, in the process of step S1202, there is an entry whose the image similarity is larger than the fifth threshold, then the control module 411 transmits a response including the value of the retrieved entry. In a case where there is no entry whose the image similarity is larger than the fifth threshold, then the control module 411 transmits a response including a value indicating an error.

Figure 13:
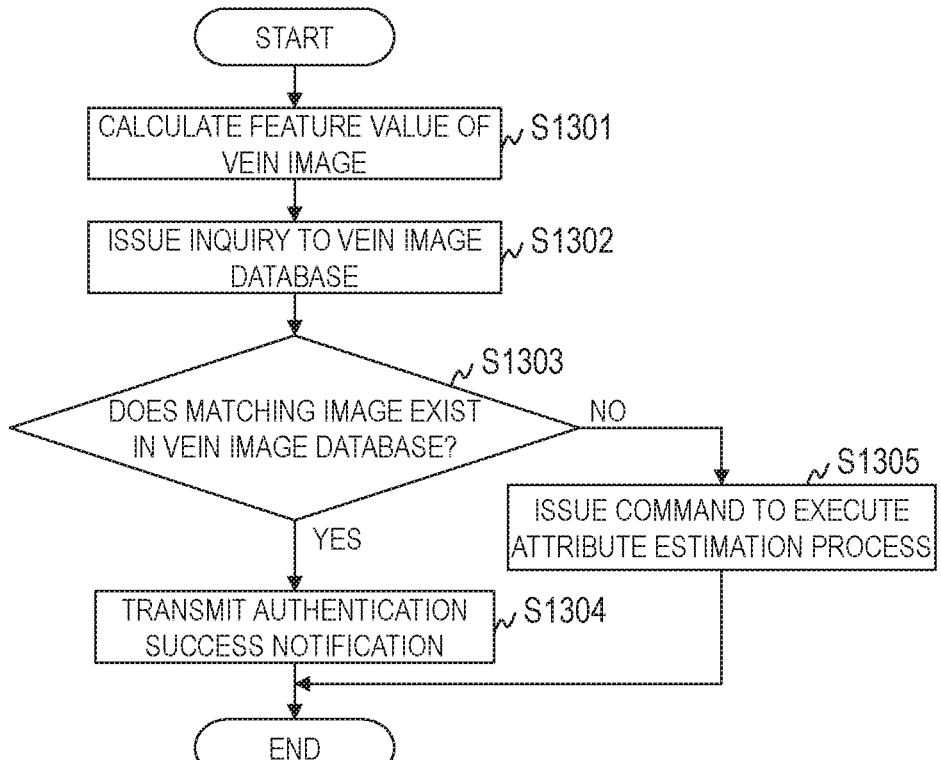
FIG. 13 is a flowchart for illustrating one example of a vein authentication process executed by the authentication module of Embodiment 1.

FIG. 13 is a flowchart for illustrating one example of a vein authentication process executed by the authentication module 312 of Embodiment 1.

The authentication module 312 calculates a feature value of the vein image (step S1301). If a feature value of the vein image has been received from the dialogue device 100, then step S1301 can be omitted.

The authentication module 312 issues, to the mother brain computer 102, an inquiry of the vein image database 413 including the feature value of the vein image (step S1302).

The authentication module 312 determines whether an image matching the vein image obtained by the dialogue device 100 exists in the vein image database 413 on the basis of the inquiry results (step S1303).

In a case where it is determined that an image matching the vein image obtained by the dialogue device 100 exists in the vein image database 413, the authentication module 312 transmits an authentication success notification including information of the identified entry, through the control module 311 (step S1304). Then, the authentication module 312 ends the authentication process for the vein image. At this time, the authentication module 312 may transmit the recorded user template 610 to the dialogue device 100 through the control module 311.

In a case where it is determined that an image matching the vein image obtained by the dialogue device 100 does not exist in the vein image database 413, the authentication module 312 calls the estimation module 313 and issues an instruction to execute an attribute estimation process, through the control module 311 (step S1305). Then, the authentication module 312 ends the vein authentication process.

If the attribute estimation process has already been executed, the attribute estimation process need not be repeated.

Figure 14:
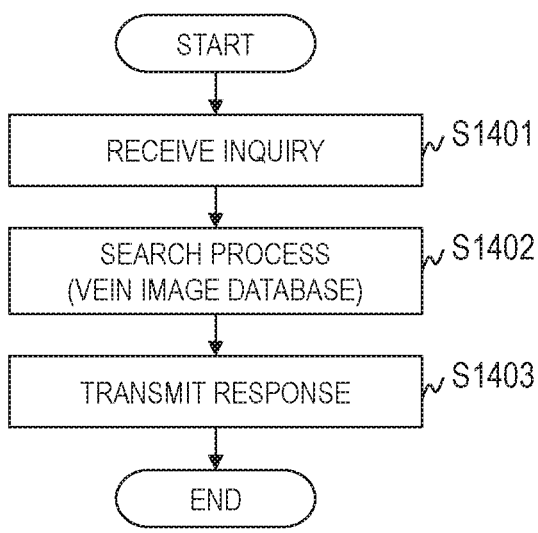
FIG. 14 is a flowchart for illustrating one example of a search process of the vein image database executed by the control module of Embodiment 1.

FIG. 14 is a flowchart for illustrating one example of a search process of the vein image database 413 executed by the control module 411 of Embodiment 1.

The control module 411 receives the inquiry of the vein image database 413 from the remote brain computer 101 (step S1401).

Next, the control module 411 executes a search process using the feature value of the vein image included in the inquiry (step S1402).

Specifically, the control module 411 calculates an image similarity by using the feature value of the vein image and the feature value 803 of each entry of the vein image database 413. The control module 411 identifies entries whose the image similarity is larger than a sixth threshold. In a case where there are a plurality of entries whose the image similarity is larger than the sixth threshold, then the control module 411 identifies one entry with the highest image similarity.

Next, the control module 411 transmits a response including the search results to the remote brain computer 101 (step S1403).

In a case where, in the process of step S1402, there is an entry whose the image similarity is larger than the sixth threshold, then the control module 411 transmits a response including the value of the retrieved entry. In a case where there is no entry whose the image similarity is larger than the sixth threshold, then the control module 411 transmits a response including a value indicating an error.

Figure 15:
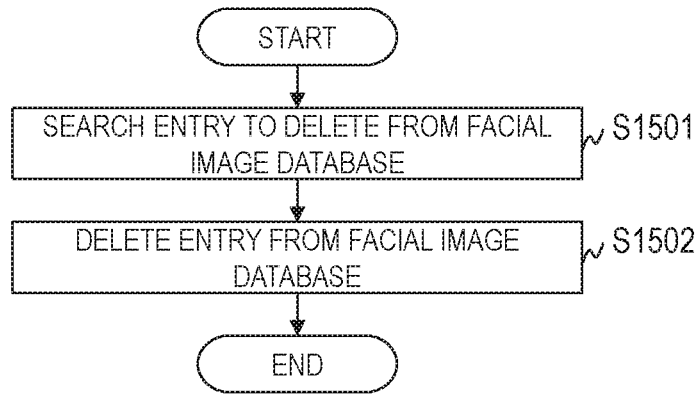
FIG. 15 is a flowchart for illustrating one example of an updating process for the database executed by the control module of Embodiment 1.

FIG. 15 is a flowchart for illustrating one example of an updating process for the database executed by the control module 411 of Embodiment 1.

The control module 411 executes the process described below if a periodic or singular event occurs. Possible events include if the amount of empty space in the storage device 402 falls below a threshold.

The control module 411 refers to the facial image database 412 and searches for entries for which values of some fields of the attributes 704 are not set (step S1501).

The control module 411 deletes the retrieved entries from the facial image database 412 (step S1502). A configuration may be adopted in which, if the entry includes a field which stores the recording date and time, then the control module 411 compares the recording date and time with the current date and time, and in a case where a prescribed period of time has elapsed, then the entry is deleted.

In FIG. 15, the process is only executed for the facial image database 412, but a similar process may be executed for the vein image database 413.

In the present embodiment, the control module 411 identifies entries to be deleted on the basis of the attributes 704 and the attributes 804, but the configuration is not limited thereto. A flag indicating an entry to be deleted may be included in the entry, for example. In such a case, the control module 411 sets a flag when the entry is added, and then deletes the flag after a prescribed period of time has elapsed. In a case where the aforementioned process has started prior to the flag being deleted, then the entry for which the flag was set is deleted.

By performing the aforementioned control on the database, it is possible to perform in smooth dialogue on the basis of information of a user 110 who has not been formally recorded in the database for authentication. A dialogue device 100 installed in a shop can perform in natural and satisfactory dialogue with a user who has not been formally recorded in the database for authentication but has been to the shop before.

Also, the facial image database 412 may be updated using dialogue content based on estimation results. One possible process is as described below, for example.

In a case where, in dialogue based on the results of an estimation process, the dialogue device 100 detects dialogue content for which the results need to be corrected, the dialogue device 100 transmits an attribute update request to the remote brain computer 101. The update request includes the types and values of the attributes to be modified. The control module 311 of the remote brain computer 101 transmits the attribute update request to the mother brain computer 102. The control module 411 of the mother brain computer 102 identifies an entry of a user 110 who has not been formally recorded, with reference to the facial image database 412, and updates the attributes 704 of the entry on the basis of the information included in the attribute update request.

Next, an example of a process of a computer system for in a case where a service is to be provided to the user 110 will be described.

Figure 16:
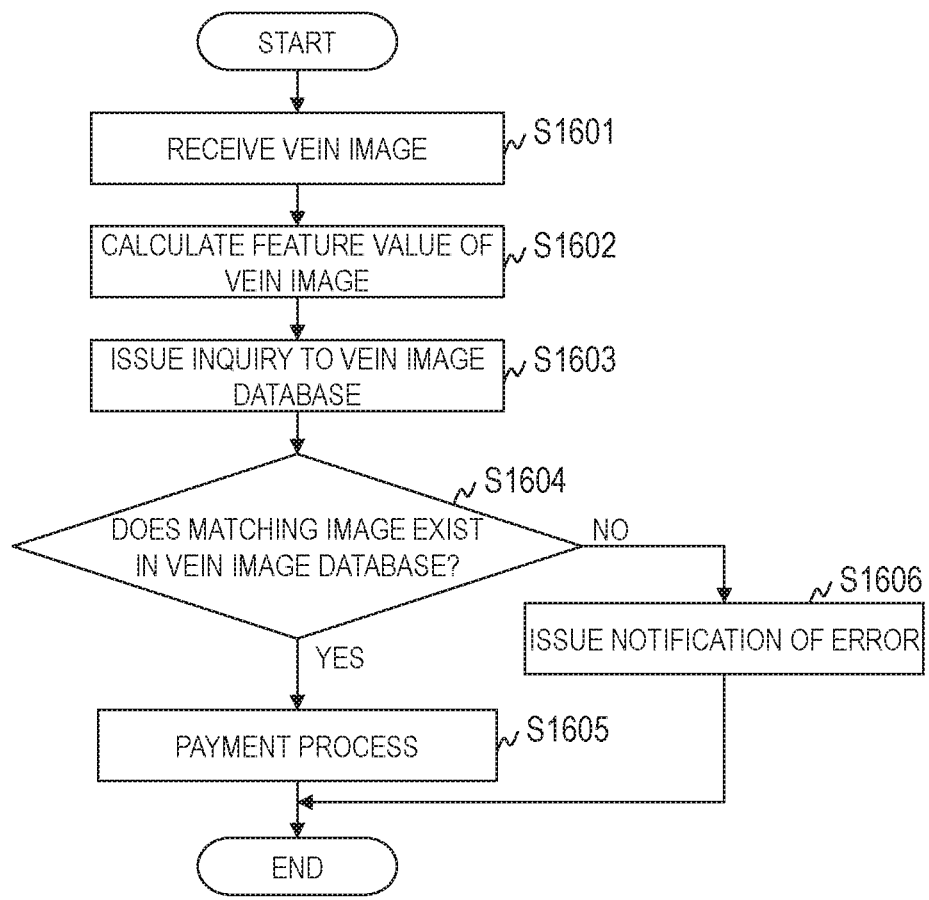
FIG. 16 is a flowchart for illustrating one example of a payment process provided by the computer system of Embodiment 1.

FIG. 16 is a flowchart for illustrating one example of a payment process provided by the computer system of Embodiment 1. Here, an example of a payment service using a vein image will be described. The payment service may alternatively use a facial image.

The remote brain computer 101 starts the process described below in a case where a vein image is received from the dialogue device 100.

The authentication module 312 of the remote brain computer 101 receives the vein image from the dialogue device 100 (step S1601).

The authentication module 312 calculates a feature value of the vein image (step S1602). In a case where a feature value of the vein image has been received from the dialogue device 100, then step S1402 can be omitted.

The authentication module 312 issues, to the mother brain computer 102, an inquiry of the vein image database 413 including the feature value of the vein image (step S1603). The mother brain computer 102, which received the inquiry, executes the process shown in FIG. 14.

The authentication module 312 determines whether an image matching the vein image obtained by the dialogue device 100 exists in the vein image database 413 on the basis of the inquiry results (step S1604).

In a case where it is determined that an image matching the vein image obtained by the dialogue device 100 exists in the vein image database 413, the authentication module 312 executes the payment process (step S1605). Then, the authentication module 312 ends the process.

In a case where it is determined that an image matching the vein image obtained by the dialogue device 100 does not exist in the vein image database 413, the authentication module 312 issues an error notification to the user 110 through the dialogue device 100 (step S1606). Then, the authentication module 312 ends the process.

In Embodiment 1, the remote brain computer 101 stores a program that realizes the authentication module 312 and the estimation module 313, but the program may alternatively be stored in the dialogue device 100 or the mother brain computer 102. Also, the dialogue device 100 or the mother brain computer 102 may be configured so as to have the function of the remote brain computer 101. Also, the dialogue device 100, the remote brain computer 101, and the mother brain computer 102 may be realized by one computer.

The remote brain computer 101 and the mother brain computer 102 may be physical computers or virtual computers.

Here, an example of a use case for the computer system of Embodiment 1 will be described. The computer system of Embodiment 1 can be applied to a mission critical system run by a company that sells goods such as food, apparel, and electronic goods, or a transportation company. In such a case, a robot installed in a branch store corresponds to the dialogue device 100, a management computer installed in the branch store corresponds to the remote brain computer 101, and a computer installed at the headquarters corresponds to the mother brain computer 102. Services provided by the mission critical system include a payment service, a product guide service, a route guidance service, and the like.

The remote brain computer 101 estimates the attributes of a user 110 who has entered the shop, and the dialogue device 100 starts making utterances using the estimated user template 600 selected on the basis of the estimation results. As a result, natural and satisfactory dialogue is enabled between the dialogue device 100 and the user 110, and thus, it is possible to attract the interest of the user 110 to the service provided by the computer system. The dialogue device 100 makes utterances recommending products as well as utterances inquiring the needs of the user on the basis of the estimated user template 600.

The remote brain computer 101 executes a facial authentication process in a case where the distance between the user 110 and the dialogue device 100 is shorter than the first threshold, and determines whether the user 110 is enrolled as a member.

In a case where the user 110 is enrolled as a member, the remote brain computer 101 issues a command to the dialogue device 100 to switch from the estimated user template 600 to the recorded user template 610. The dialogue device 100 makes utterances to the user who has enrolled as a member using the recorded user template 610. As a result, more natural and satisfactory dialogue with the user 110 is possible.

The remote brain computer 101 executes a vein authentication process in a case where the distance between the user 110 and the dialogue device 100 is shorter than the second threshold, and determines whether the user 110 is enrolled as a member.

In a case where the user 110 is enrolled as a member, the remote brain computer 101 issues a command to the dialogue device 100 to switch from the estimated user template 600 to the recorded user template 610. The dialogue device 100 makes utterances to the user who has enrolled as a member using the recorded user template 610. As a result, more natural and satisfactory dialogue with the user 110 is possible.

In a case where the computer system of Embodiment 1 is applied to a mission critical system, then it is possible to quickly provide an opportunity for a user 110 who has not been authenticated to use the service through dialogue based on the results of the estimation process. Also, the dialogue device 100 can perform in dialogue matching the needs and preferences of the user 110 according to the results of the authentication process. Thus, it is possible to provide appropriate service to the user 110.

The computer system of Embodiment 1 can be applied not only to mission critical systems but also various other types of systems such as security systems. In a case where the computer system of Embodiment 1 is to be applied to a security system that provides a security service, then the remote brain computer 101 may execute the following process instead of the process of step S1305. Specifically, in a case where neither the facial authentication process nor the vein authentication process are successful, then the remote brain computer 101 may instruct the dialogue device 100 to issue a warning to the user 110, or contact a security company.

In Embodiment 1, the remote brain computer 101 estimates the attributes of the user 110 using an image, and the dialogue device 100 makes utterances on the basis of the estimation results. In the attribute estimation process, there is no need to refer to the facial image database 412 or the vein image database 413 in which images are stored, which allows the process to be executed more quickly than the authentication process. Thus, the estimated user template 600 (algorithm) to be used for dialogue can be quickly selected, and dialogue with the user 110 can be started quickly. Also, dialogue based on the estimation results is enabled for user who are recorded in neither the facial image database 412 nor the vein image database 413.

Embodiment 2

Embodiment 2 differs from Embodiment 1 in that in Embodiment 2, the data reference range is narrowed down using the results of the attribute estimation process in the facial authentication process, and the data reference range is narrowed down using the results of the attribute estimation process in the vein image process or the results of the facial authentication process. Below, the description of Embodiment 2 will be centered on differences from Embodiment 1.

The configuration of a computer system of Embodiment 2 is the same as the configuration of the computer system of Embodiment 1. The configuration of a dialogue device 100, a remote brain computer 101, and a mother brain computer 102 of Embodiment 2 are the same as the configuration of the respective devices in Embodiment 1. Also, the data structures of the databases stored by each device are the same as the data structures of the databases of Embodiment 1.

In Embodiment 2, portions of the attribute estimation process, the facial authentication process, and the vein authentication process differ.

First, the attribute estimation process of Embodiment 2 will be described. In step S1014, the estimation module 313 stores the results of the attribute estimation process in the storage device 302. Other processes are the same as Embodiment 1.

Next, the facial authentication process and the search process for the facial image database 412 of Embodiment 2 will be described.

In step S1102, the authentication module 312 issues an inquiry including the results of the attribute estimation process stored in the storage device 302.

The control module 411 of the mother brain computer 102, which received the inquiry, executes the process below in step S1202.

The control module 411 identifies entries that match the results of the attribute estimation process with reference to the facial image database 412. The control module 411 calculates the image similarity by using the feature value of the facial image and the feature value 703 of each identified entry. The control module 411 identifies entries whose the image similarity is larger than a fifth threshold.

In a case where there are no entries whose the image similarity is larger than the fifth threshold, then the control module 411 identifies entries whose the image similarity is larger than a seventh threshold. The above is the process of step S1202 of Embodiment 2.

In step S1203, the control module 411 transmits a response including a value indicating success of the search process and the value of an entry whose the image similarity is larger than the fifth threshold, or a value indicating failure of the search process and a value of an entry where the image similarity is larger than the seventh threshold.

In step S1103, the authentication module 312 makes a determination on the basis of the value indicating the results of the search process. Also, in step S1105, the authentication module 312 stores, in the storage device 302, the values of entries whose the image similarity is larger than the seventh threshold.

Next, the vein authentication process and the search process for the vein image database 413 of Embodiment 2 will be described.

In step S1302, the authentication module 312 issues an inquiry including the results of the attribute estimation process and/or the results of the facial image authentication process. Specifically, if only the results of the attribute estimation process are stored in the storage device 302, the authentication module 312 performs an inquiry including the results of the attribute estimation process, and if the results of the facial image authentication process are stored in the storage device 302, then the authentication module 312 performs an inquiry including the results of the facial image authentication process.

The control module 411 of the mother brain computer 102, which received the inquiry, executes the process below in step S1402.

In a case where the control module 411 receives an inquiry including the results of the attribute estimation process, the control module identifies entries that match the results of the attribute estimation process with reference to the vein image database 413. In a case where the control module 411 receives an inquiry including the results of the facial authentication process, the control module identifies entries that match the results of the facial authentication process with reference to the vein image database 413.

The control module 411 uses the feature value of the facial image and the feature value 803 of each identified entry and calculates the image similarity. The control module 411 identifies entries whose the image similarity is larger than a sixth threshold. The above is the description of the process of step S1402.

The process of steps S1401 and S1403 is the same as the process of Embodiment 1.

According to Embodiment 2, it is possible to increase the speed of the facial authentication process by using the results of the attribute estimation process, and it is possible to increase the speed of the vein authentication process by using the results of the attribute estimation process and/or the results of the facial authentication process.

Embodiment 3

Embodiment 3 differs from Embodiment 1 in that portions of the facial image database 412 and the vein image database 413 are copied to the remote brain computer 101 on the basis of the results of the attribute estimation process and the results of the facial authentication process. Below, the description of Embodiment 3 will be centered on differences from Embodiment 1.

The configuration of a computer system of Embodiment 3 is the same as the configuration of the computer system of Embodiment 1. The configuration of a dialogue device 100, a remote brain computer 101, and a mother brain computer 102 of Embodiment 3 are the same as the configuration of the respective devices in Embodiment 1. Also, the data structures of the databases stored by each device are the same as the data structures of the databases of Embodiment 1.

In Embodiment 3, portions of the attribute estimation process, the facial authentication process, and the vein authentication process differ.

First, the attribute estimation process of Embodiment 3 will be described.

In step S1014, the estimation module 313 transmits an obtaining request for data including the results of the attribute estimation process to the mother brain computer 102 through the control module 311.

In a case where the control module 411 of the mother brain computer 102 receives the request, the control module searches, from the facial image database 412, for an entry whose the data of the attributes 704 matches the value included in the obtaining request for data. The control module 411 transmits a response including the retrieved entry to the estimation module 313.

The estimation module 313 stores the entry including the received response to the storage device 302.

Next, the facial authentication process of Embodiment 3 will be described.

In step S1102, the authentication module 312 executes the following process using an entry of the facial image database 412 stored in the storage device 302 instead of issuing an inquiry to the mother brain computer 102. Thus, in Embodiment 3, the search process for the facial image database 412 shown in FIG. 12 is not executed.

The authentication module 312 calculates, through the estimation module 313, the image similarity of the facial image using entries stored in the storage device 302, and searches for entries whose the image similarity of the facial image is larger than the fifth threshold. In a case where there are no entries whose the image similarity is larger than the fifth threshold, then the authentication module 312 searches, from among entries stored in the storage device 302, entries whose the image similarity of the facial images is larger than an eighth threshold, and stores only the retrieved entries. Other processes are the same as Embodiment 1.

Next, the vein authentication process of Embodiment 3 will be described.

In step S1302, the authentication module 312 executes the following process using an entry of the facial image database 412 stored in the storage device 302 instead of issuing an inquiry to the mother brain computer 102. Thus, in Embodiment 3, the search process for the vein image database 413 shown in FIG. 14 is not executed.

The authentication module 312 searches for entries, from among entries whose the image similarity is larger than the eighth threshold, whose the image similarity of the vein images is larger than the sixth threshold. Other processes are the same as Embodiment 1.

According to Embodiment 3, a portion of the database narrowed down on the basis of the results of the attribute estimation process and the results of the facial authentication process is stored in the remote brain computer 101, thereby reducing the number of accesses to the mother brain computer 102. As a result, the speed of the authentication process can be increased, and the authentication process can be performed even if the mother brain computer 102 cannot be accessed.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system that performs in dialogue with a user and provides a prescribed service, comprising:
    an imaging device being configured to obtain an image;
    a computer being configured to select an algorithm for generating dialogue content to be outputted to the user; and
    a generation device being configured to generate dialogue content on the basis of the algorithm,
    the computer having an arithmetic device, a storage device coupled to the arithmetic device, and an interface coupled to the arithmetic device, and coupling, through the interface, to a database that stores an authentication image used for an authentication process that uses an image obtained by the imaging device,
    the arithmetic device being configured to:
    calculate a distance between the user and the imaging device;

execute an attribute estimation process that estimates an attribute that characterizes the user using the image obtained by the imaging device in a case where the distance is larger than a first threshold, and select the algorithm on the basis of results of the attribute estimation process;

execute an authentication process that identifies the user on the basis of the image obtained by the imaging device and the database in a case where the distance is less than or equal to the first threshold, and select the algorithm on the basis of results of the authentication process; and issues a notification of the selected algorithm to the generation device.

2. The computer system according to claim 1, wherein the arithmetic device is configured to:

execute the authentication process in a case where the distance is less than or equal to the first threshold after the algorithm is selected on the basis of results of the attribute estimation process;

select the algorithm on the basis of results of the authentication process; and issues a notification of the selected algorithm to the generation device.

3. The computer system according to claim 2, wherein the authentication process includes a first authentication process and a second authentication process with a higher authentication accuracy than the first authentication process, and wherein the arithmetic device is configured to:

execute the first authentication process in a case where the distance is less than or equal to the first threshold and larger than a second threshold, and select the algorithm on the basis of results of the first authentication process; and executes the second authentication process in a case where the distance is less than or equal to the second threshold, and select the algorithm on the basis of results of the second authentication process.

4. The computer system according to claim 3, wherein the arithmetic device is configured to:

identify a reference range over which the database is referred to in the first authentication process on the basis of results of the attribute estimation process; and identify a reference range over which the database is referred to in the second authentication process on the basis of results of the first authentication process.

5. A dialogue control method of a computer system that performs in dialogue with a user and provides a prescribed service, the computer system including an imaging device being configured to obtain an image; a computer being configured to select an algorithm for generating dialogue content to be outputted to the user, and a generation device being configured to generate dialogue content on the basis of the algorithm, the computer having an arithmetic device, a storage device coupled to the arithmetic device, and an interface coupled to the arithmetic device, and coupling, through the interface, to a database that stores an authentication image used for an authentication process that uses an image obtained by the imaging device, the dialogue control method including:

a first step of calculating, by the arithmetic device, a distance between the user and the imaging device;

a second step of executing, by the arithmetic device, an attribute estimation process that estimates an attribute that characterizes the user using the image obtained by the imaging device in a case where the distance is larger than a first threshold;

a third step of selecting, by the arithmetic device, the algorithm on the basis of results of the attribute estimation process;

a fourth step of executing, by the arithmetic device, an authentication process that identifies the user on the basis of the image obtained by the imaging device and the database in a case where the distance is less than or equal to the first threshold;

a fifth step of selecting, by the arithmetic device, the algorithm on the basis of results of the authentication process; and a sixth step of issuing, by the arithmetic device, a notification of the selected algorithm to the generation device.

6. The dialogue control method according to claim 5, further including:

a step of executing, by the arithmetic device, the authentication process in a case where the distance is less than or equal to the first threshold after the algorithm is selected on the basis of results of the attribute estimation process;

a step of selecting, by the arithmetic device, the algorithm on the basis of results of the authentication process; and a step of issuing, by the arithmetic device, a notification of the selected algorithm to the generation device.

7. The dialogue control method according to claim 6, wherein the authentication process includes a first authentication process and a second authentication process with a higher authentication accuracy than the first authentication process, wherein the fourth step includes:

a seventh step of executing, by the arithmetic device, the first authentication process in a case where the distance is less than or equal to the first threshold and larger than a second threshold; and an eighth step of executing, by the arithmetic device, the second authentication process in a case where the distance is less than or equal to the second threshold, and wherein the fifth step includes:

a step of selecting, by the arithmetic device, the algorithm on the basis of results of the first authentication process; and a step of selecting, by the arithmetic device, the algorithm on the basis of results of the second authentication process.

8. The dialogue control method according to claim 7, wherein the seventh step includes a step of identifying, by the arithmetic device, a reference range over which the database is referred to in the first authentication process on the basis of results of the attribute estimation process, and wherein the eighth step includes a step of identifying, by the arithmetic device, a reference range over which the database is referred to in the second authentication process on the basis of results of the first authentication process.

9. A computer included in a computer system that performs in dialogue with a user and provides a prescribed service, comprising:

an arithmetic device;

a storage device coupled to the arithmetic device;

an interface coupled to the arithmetic device; and an imaging device coupled to the arithmetic device which obtains an image, the computer coupling, through the interface, to a dialogue device that performs in dialogue with the user, and to a database that stores an authentication image used for an authentication process that uses an image obtained by the imaging device, the arithmetic device being configured to:

calculate a distance between the user and the imaging device;

execute an attribute estimation process that estimates an attribute that characterizes the user using the image obtained by the imaging device in a case where the distance is larger than a first threshold, and select an algorithm for generating dialogue content to be outputted to the user on the basis of results of the attribute estimation process;

execute an authentication process that identifies the user on the basis of the image obtained by the imaging device and the database in a case where the distance is less than or equal to the first threshold, and select the algorithm on the basis of results of the authentication process, and generate dialogue content on the basis of the selected algorithm.

10. The computer according to claim 9, wherein the arithmetic device is configured to:

execute the authentication process in a case where the distance is less than or equal to the first threshold after the algorithm is selected on the basis of results of the attribute estimation process; and select the algorithm on the basis of results of the authentication process.

11. The computer according to claim 10, wherein the authentication process includes a first authentication process and a second authentication process with a higher authentication accuracy than the first authentication process, and wherein the arithmetic device is configured to:

execute the first authentication process in a case where the distance is less than or equal to the first threshold and larger than a second threshold, and select the algorithm on the basis of results of the first authentication process; and execute the second authentication process in a case where the distance is less than or equal to the second threshold, and select the algorithm on the basis of results of the second authentication process.

12. The computer according to claim 11, wherein the arithmetic device is configured to:

identify a reference range over which the database is referred to in the first authentication process on the basis of results of the attribute estimation process; and identify a reference range over which the database is referred to in the second authentication process on the basis of results of the first authentication process.

* * * * *